United States Patent
Harasaki et al.

(10) Patent No.: US 6,493,093 B2
(45) Date of Patent: Dec. 10, 2002

(54) BAT-WING ATTENUATION IN WHITE-LIGHT INTERFEROMETRY

(75) Inventors: Akiko Harasaki, Kawasaki (JP); Joanna Schmit, Tucson, AZ (US)

(73) Assignee: Veeco Instruments Inc., Tucson, AZ (US)

(*) Notice: Subject to any disclaimer, the term of this patent is extended or adjusted under 35 U.S.C. 154(b) by 48 days.

(21) Appl. No.: 09/833,880

(22) Filed: Apr. 12, 2001

(65) Prior Publication Data

US 2002/0149781 A1 Oct. 17, 2002

(51) Int. Cl.$^7$ ................................................ G01B 11/02
(52) U.S. Cl. ........................................ 356/497; 356/511
(58) Field of Search ................................ 356/497, 511, 356/512

(56) References Cited

U.S. PATENT DOCUMENTS

| | | | |
|---|---|---|---|
| 5,129,724 A | * 7/1992 | Brophy et al. | 356/511 |
| 5,133,601 A | 7/1992 | Cohen et al. | 356/497 |
| 5,471,303 A | 11/1995 | Ai et al. | 357/497 |
| 5,633,715 A | 5/1997 | Ai et al. | 356/355 |
| 5,953,124 A | 9/1999 | Deck | 356/497 |

* cited by examiner

Primary Examiner—Drew A. Dunn
(74) Attorney, Agent, or Firm—Antonio R. Durando; Durando Birdwell & Janke, PLC

(57) ABSTRACT

Bat wings are removed at step discontinuities within the coherence length of the light source of a vertical-scanning interferometer. A first height profile is obtained from a correlogram using a coherence-sensing technique. A second height profile is obtained from phase measurements at the best-focus frame position of the scanner. The two profiles are compared, and phase ambiguities are removed in conventional manner. In addition, during unwrapping the differences in height between two adjacent pixels obtained both by coherence sensing and by phase measurements are compared to $f\lambda/4$. Where the inter-pixel height difference calculated by coherence sensing is smaller and the inter-pixel height difference calculated by phase is larger than $f\lambda/4$, the phase measurement is corrected by $2\pi$ increments until both coherence and phase inter-pixel height differences are within $f\lambda/4$. This additional step removes bat-wing effects from profiles obtained by phase measurement.

17 Claims, 10 Drawing Sheets

(a)

(b)

(c)

(d)

BAT-WING ATTENUATION IN WHITE-LIGHT INTERFEROMETRY

BACKGROUND OF THE INVENTION

1. Field of the Invention

This invention is related in general to the field of white-light interferometry. In particular, the invention relates to the removal of bat wings from discontinuous surface profiles using a combination of coherence and phase data.

2. Description of the Related Art

One method of determining surface height involves the use of a broad-spectral-width light source in an interferometer and measuring the degree of modulation contrast as a function of optical path difference (OPD). The approach is typically referred to in the art as vertical scanning interferometry (VSI). Due to the large spectral bandwidth of the source, the coherence length of the source is short and good contrast fringes are obtained only when the two paths of the interferometer are closely matched in length. By looking at the position of the sample surface for which the fringe contrast is maximum while the optical path difference is varied, the height variations across the sample can be determined. In this measurement there are no height ambiguities or focus errors because the interferometer is adjusted to have the sample in focus when the OPD is zero.

There are many algorithms for finding the coherence peak of VSI correlograms. However, while this is a very good technique for measuring many surfaces, it does not work well in the vicinity of step heights that are less than the coherence length of the light source. A diffraction effect at the discontinuity causes the coherence envelope of the correlogram to skew and the peak to shift. The problem has been referred to in the art as a "bat wing" effect because of the shape of the erroneous information produced by VSI data. Bat wings are produced by every well-established coherence-peak-sensing algorithm used in the art and it can be shown that diffraction effects modify the coherence envelope more than the phase of the correlogram. Thus, phase-shifting interferometry (PSI), herein also referred to as phase sensing, is preferred when steplike discontinuities cause bat wings.

FIG. 1 illustrates bat-wing effects obtained using various VSI algorithms in measuring the surface profile of a 460-nm height standard (VLSI Standards Inc., SHS 4600 Å). FIG. 1A is a surface profile processed using a centroid algorithm, as disclosed by Ai et al. in U.S. Pat. No. 5,633,715. FIG. 1B is a profile obtained from the centroid of the recovered modulation contrast by the Fourier transform algorithm. FIG. 1C is a profile obtained from the centroid of the recovered modulation contrast by the Hilbert transform algorithm. FIG. 1D is a profile obtained from the phase slope in the Fourier domain. The light source used in the measurement had a coherence length of 1.2 microns. Bat wings clearly appear in all profiles because the coherence length of the light source exceeds the step height. The top portion close to the edge of the step discontinuity, whose height is less than the coherence length, typically appears higher and the bottom portion appears lower than they actually are. From FIG. 1 it is clear that the effect is named bat wings because of its appearance.

The combination of phase and coherence-peak sensing techniques (PSI with VSI) has been explored for some time to provide the advantages of both methods. U.S. Patent No. 5,133,601 to Cohen et al. discloses a technique, referred to as PSI "on the fly," whereby the resolution of VSI is improved by calculating phase around the peak of the coherence envelope. U.S. Patent No. 5,471,303 to Ai et al. combines independent VSI and PSI data to improve the accuracy of height measurements in steep regions and in areas with large inter-pixel steps in the test surface. In U.S. Patent No. 5,953,124, Deck further refines the combination of VSI and PSI analysis applied to a single 3-D interferogram to produce an improved height profile. However, no experimental results have been reported that teach the removal of bat wings. This invention is directed at providing a method and apparatus for eliminating bat-wing effects using a coherence-peak-sensing technique in combination with a phase-unwrapping algorithm.

BRIEF SUMMARY OF THE INVENTION

The primary objective of this invention is a method for removing bat-wing effects from the surface profile of step discontinuities that are less than the coherence length of the light used in vertical scanning interferometry.

Another object is a procedure that produces an improved surface profile by combining coherence-peak detection with phase measurement using vertical scanning interferometry data and phase unwrapping to eliminate $2\pi$ ambiguities.

Finally, a goal of the invention is a procedure that is suitable for implementation with relatively minor modifications to existing interference microscope objectives and interferometric surface profilers.

According to these and other objectives, the present invention consists of performing white-light vertical scanning interferometry to produce a three-dimensional interferogram corresponding to a sample surface. A first height profile is obtained from the correlogram using a coherence-peak-sensing technique. A second height profile is obtained from phase measurements. The two profiles are compared, and phase ambiguities are removed according to the invention using a phase-unwrapping algorithm that eliminates the effects of diffraction at the edges of relatively smooth surfaces that are separated by step discontinuities within the coherence length of the light source of the system. According to one aspect of the invention, the unwrapping step is carried out starting from pixels in relatively smooth areas of the sample surface and moving toward pixels at the edge of step discontinuities. Thus, the unwrapping process is designed to progress from areas of reliable data, such as evidenced by a high energy profile, toward step boundaries, where the energy profile is lowest.

According to another aspect of the invention, the unwrapping algorithm includes a novel step whereby the differences in height between two adjacent pixels obtained both by coherence-peak and by phase measurements are compared to a predetermined height considered empirically to be approximately as large as the largest interpixel diffraction effect produced by the coherence-peak technique. Since it has been established that diffraction effects cause greater artifacts in the coherence envelope than in the phase data, in each instance where the inter-pixel height difference calculated by coherence-peak detection is smaller and the inter-pixel height difference calculated by phase is larger than the selected height, the phase measurement is corrected by $2\pi$ increments (i.e., height increments of $f\lambda/4$, as defined below) so that both coherence and phase inter-pixel height differences are within the selected height. In practice, it was determined that approximately ¼ the mean wavelength of the light source is a suitable value for the selected height when measuring smooth flat and round surfaces.

This additional step in the unwrapping procedure has been found to practically remove all bat-wing effects from profiles obtained by phase measurement. The resulting quality of the height data in each of the step regions is thus kept to within the resolution of the PSI measurements even at the step edges.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1A:
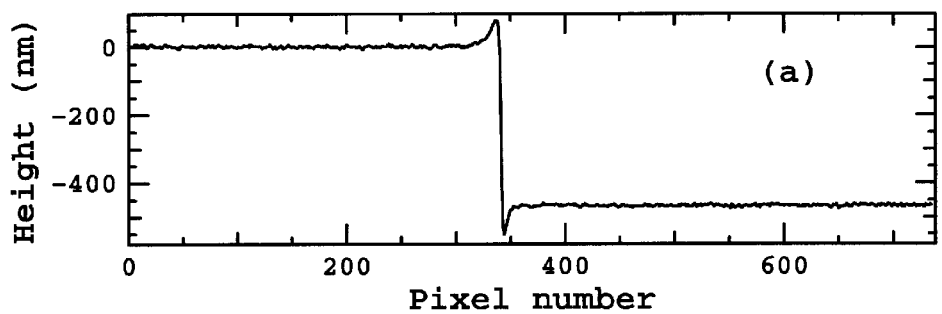
FIGS. 1A–1D are surface profiles of a 460-nm standard sample generated by four alternative algorithms.
Figure 1B:
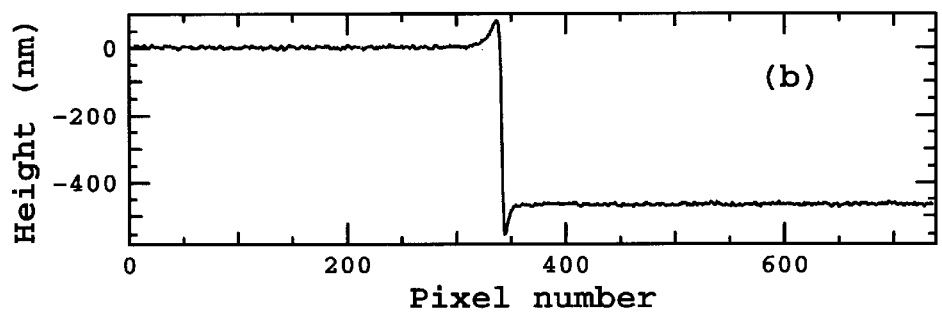
Figure 1C:
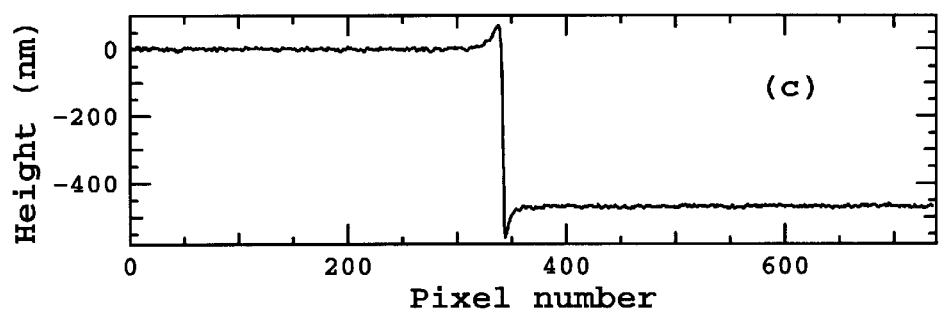
Figure 1D:
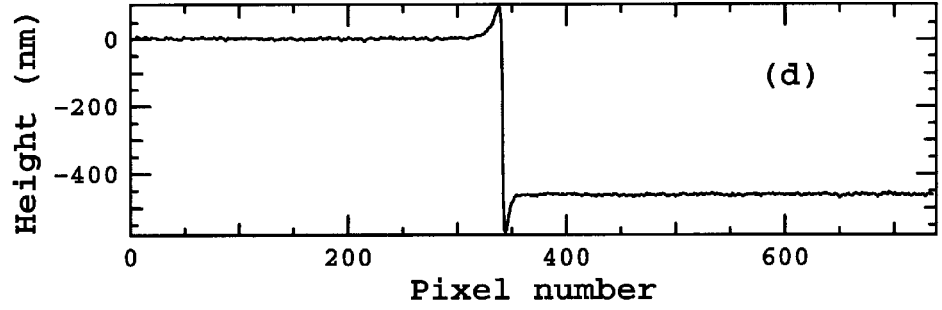

The heart of this invention is based on the realization that bat wings at the edges of step discontinuities of surface profiles obtained by interferometric measurements result from diffraction effects that modify coherence-envelope readings more greatly than phase measurements. This property is advantageously used to provide a straight-forward criterion for correcting the profile obtained by phase data at pixels approaching the edges of step discontinuities, thereby substantially removing bat-wing effects.

As is well understood by those skilled in the art, the interference intensity distribution along the vertical scanning direction, herein called a "correlogram," is attenuated by the coherence envelope with its peak (best contrast fringes) being at about the best focus position. At the same time, this best focus position (peak of the coherence envelope) occurs when the optical paths of both arms of the interferometer are equal. Thus, by finding the peak of the coherence envelope, the position (relative height) of the object point as seen by the detector is estimated.

Many algorithms exist for finding a peak of the coherence signal. See, for example, G. S. Kino et al., "Mirau Correlation Microscope," Appl. Opt. 32, 3438–3783 (1990); S. S. C. Chim et al., "Three-Dimensional Image Realization in Interference Microscopy," Appl. Opt. 31, 2550–2553 (1992); P. J. Caber, "Interferometric Profiler for Rough Surface," Appl. Opt. 32, 3438–3441 (1993); P. de Groot, "Surface Profiling by Analysis of White-Light Interferograms in the Spatial Frequency Domain," Journal of Modern Optics, 42(2), 389–401 (1995); K. G. Larkin, "Effective Nonlinear Algorithm for Envelope Detection in White Light Interferometry," J. Opt. Am. A. 13, 832–843 (1996); C. Ai and E. L. Novak, U.S. Pat. No. 5,633,715 (1997); P. Sandoz, "Wavelet Transform as a Processing Tool in White-Light Interferometry," Opt. Lett. 22, 1065–1067 (1997); J. Recknagel et al., "Analysis of White Light Interferograms Using Wavelet Methods," Opt. Commun. 148, 122–128 (1998); and M. Hart et al., "Fast Surface Profiling by Spectral Analysis of White-Light Interferograms with Fourier Transform Spectroscopy," Appl. Opt. 37, 1764–1769 (1998). Some of these algorithms find the coherence peak in direct way, while some of them estimate it indirectly. However, it is not necessary to find the peak of the coherence envelope because other parameters of the coherence signal also relate to the position of the object (for example, the position of the minimum or the maximum of the strongest fringes). Moreover, analysis of the coherence signal can be done in the spatial/time as well as in the frequency domain because equivalent processes/analyses can be done in both domains. Thus, different algorithms analyzing the coherence signal may find different parameters of the coherence signal, but all of them relate to the peak of the envelope. Accordingly, for the purposes of this invention, the terms coherence-peak-sensing, coherence-peak-detection, coherence sensing and similarly phrased terminology referring to algorithms and techniques for estimating the peak of the coherence function associated with a correlogram are all intended to encompass any algorithm that estimates the coherence peak or a different, peak-related parameter. Similarly, the term phase sensing is intended to encompass all algorithms and techniques based on phase-shifting and similar phase-based approaches.

Figure 2:
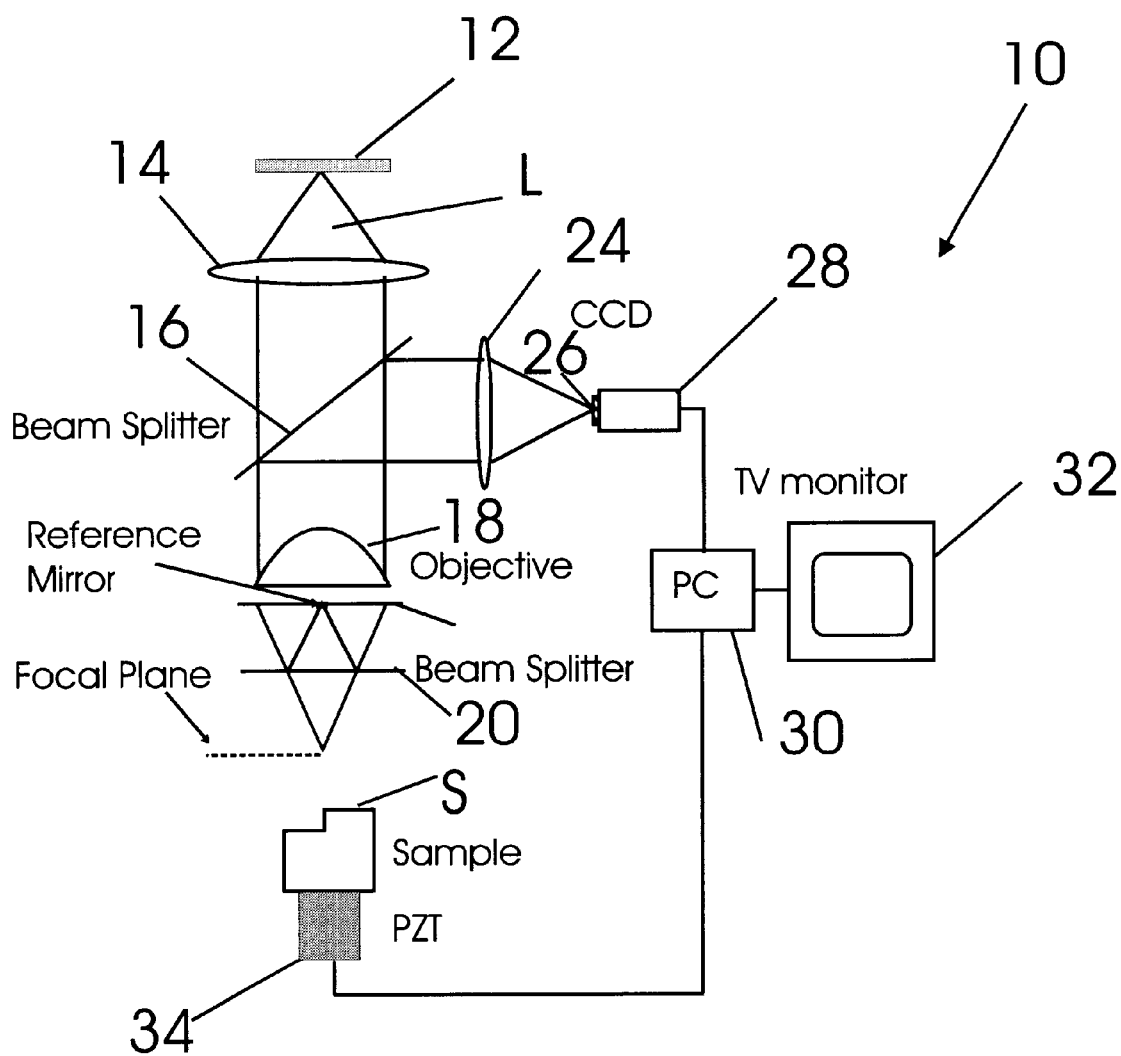
FIG. 2 is a simplified schematic representation of a conventional Mirau interference microscope.

Referring to the drawings, wherein like parts are designated throughout with like numerals and symbols, FIG. 2 illustrates in schematic view the basic configuration of a conventional Mirau interference microscope used to practice the invention. The interferometer 10 comprises a light source 12 directing a beam of light L through a collimator 14 and a beam splitter 16 downward in the direction of a test surface S. The light passes through a microscope objective 18 focused on the test surface S. The objective incorporates an interferometer comprising a beam splitter 20 and a reference mirror 22. The sample stage is adapted for relative movement with respect to the reference mirror, so that interference fringes are produced as a result of the optical path difference between the reference mirror 22 and the test surface S. The beams reflected from the reference mirror and the test surface pass back up through the optics of the microscope objective 18 and upward to the beam splitter 16, which diverts the wavefront to optics 24 that focus it onto a solid-state detector array 26 in a camera 28. Typically, the detector array 26 consists of individual CCD cells or other sensing apparatus adapted to produce a two-dimensional array of digitized intensity data corresponding to light signals received at each sensor cell as a result of the interference of the coherent light beams reflected from individual x-y coordinates or pixels in the surface S and from corresponding coordinates in the reference mirror 22. Appropriate electronic hardware is provided to transmit the digitized intensity data generated by the detector to a microprocessor 30 for processing and to a monitor 32 for direct observation. A piezoelectric means 34 is typically used for varying the optical path difference. In addition, the stage holding the sample S is adapted for vertical movement, typically with a finely tuned gear motor, to focus the image of the test surface on the detector array 26.

The invention was tested using a Mirau interferometer (Veeco Model WYKO NT -2000). A Nikon 50X magnification objective 18, with a numerical-aperture factor (NA) of 0.55, was used because bat-wings effects are significant for large numerical apertures. Correlograms were detected with a conventional CCD video camera. A piezoelectric transducer (Queensgate Instruments Model NPS-Z-15B, stage position) was used to ensure equally spaced scanning steps between frames. The broadband light source was either an unfiltered tungsten bulb or a filtered source with a center wavelength at about 600 nm and an 80-nm bandwidth. The former gives better resolution in coherence-peak-sensing techniques, while the latter is preferred for PSI with high-magnification objectives.

According to the invention, a white-light correlogram is obtained from conventional techniques. It is understood that the terms white light and broadband light are used interchangeably for the purposes of the invention to refer to any light source having a sufficiently short coherence length to enable the use of coherence-peak-detection algorithms. There are two basic ways to find the coherence-peak position between frames from discrete modulation-contrast data. One is a least-squares fitting approach that assumes a function form for the coherence envelope from the source distribution. The other is based on the calculation of the centroid of the correlogram. In an ideal, noise-free correlogram, the two approaches yield identical results.

Figure 3:
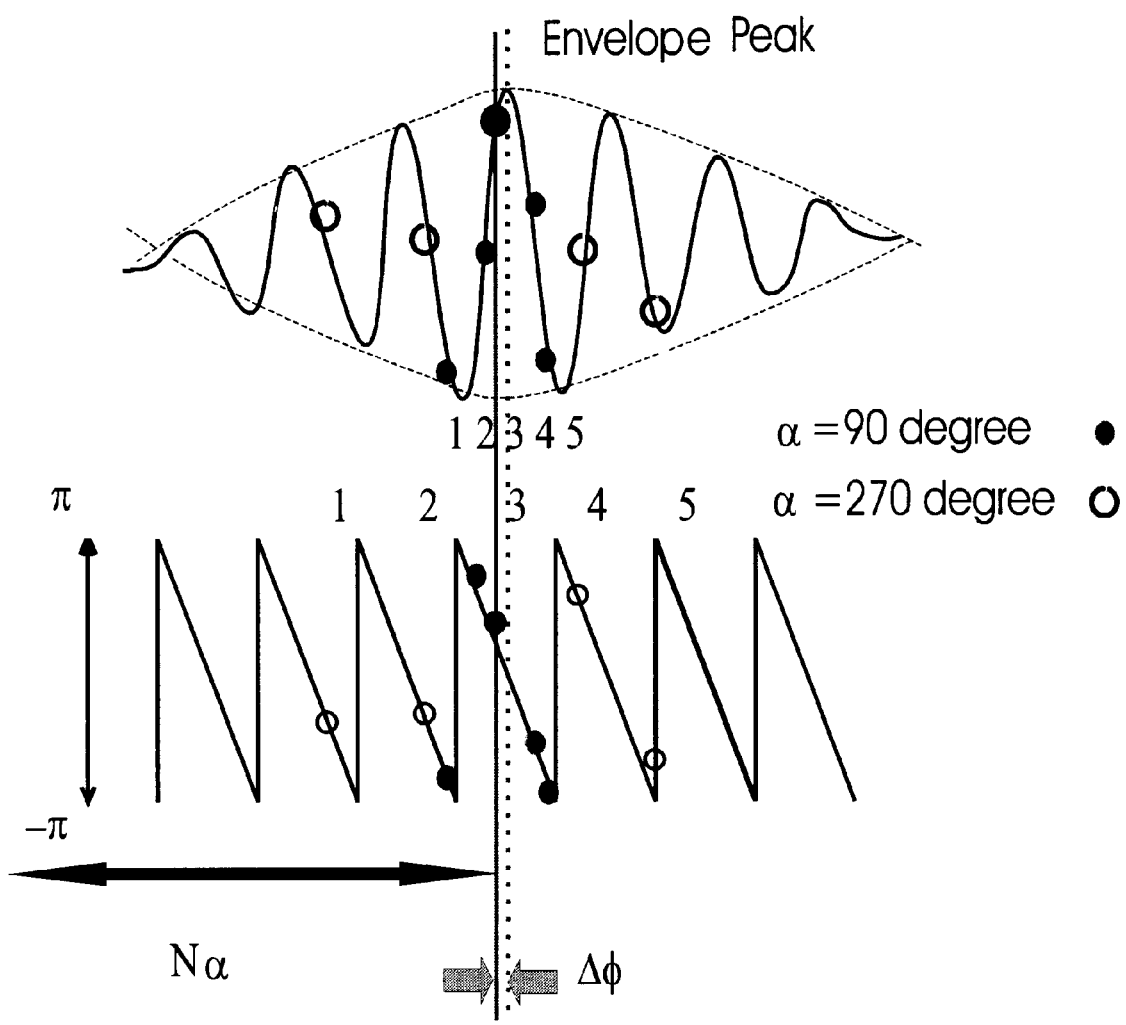
FIG. 3 is a typical correlogram obtained from a detector cell in the image plane of an interferometer as the OPD is varied by vertically scanning the test sample, including a plot of corresponding phase information.

For example, the modulation contrast M at each pixel can be calculated at each step of vertical scanning (i.e., at each frame) using the expression $$M^2 (I2-I4)^2 - (I1-I3)(I3-I5) \quad (1)$$

where I1–I5 are five consecutive frames of intensity data measured for each pixel, as illustrated in FIG. 3. Typically, the phase step a between frames is set at 90° (corresponding to a scanning step $\Delta = \lambda/8$, where $\lambda$ is the mean wavelength), or to 270° (a scanning step of $\Delta = 3\lambda/8$). The top portion of FIG. 3 illustrates a typical correlogram with data points corresponding to both scanning steps.

When the modulation M is at its maximum, the best-focus scanning-frame position (step number) is determined. Thus, the coherence envelope is calculated by first finding the best-focus frame for each pixel during vertical scanning. Then the peak location of the coherence envelope is calculated from the best-focus frame by a least-squares fitting of the modulation contrast. As is well understood in the art, the position of the coherence-envelope peak can be expressed as $$Z_{envelope}(x,y) = \Delta(\text{step number}) + \Delta z, \quad (2)$$

where $$\Delta z = 0.4\Delta(L1+3L2-3L4-L5)/(L1-2L3+L5), \quad (3)$$

Ln representing the logarithm of the modulation contrast value Mn, and 0.4 being a parameter related to the parabolic function used to model the coherence envelope. The correction term $\Delta z$ is important to carry out the phase unwrapping process addressed below.

The phase difference $\Delta\phi$ between the zero optical path difference and the best-focus scanning position is then evaluated by use of the following well-known five-frame algorithm $$\tan(\Delta\phi) = (2\sin\alpha)(I2-I4)/(2I3-I5-I1), \quad (4)$$

where $$\sin^2\alpha = [4(I2-I4)^2 - (I1-I5)^2]/[4(I2-I4)^2], \quad (5)$$

and I3 is the central frame of reference. See P. Sandoz et al., "Unambiguous Profilometry by Fringe-Order Identification in White-Light Phase-Shifting Interferometry," J. Mod. Opt. 44, 519–534 (1997). On the basis of this algorithm, the surface height can be expressed in terms of phase difference $\Delta\phi$ as follows, $$Z_{phase}(X,Y) = \Delta(\text{step number}) + f/2(\Delta\phi\lambda/2\pi), \quad (6)$$

where f is the numerical-aperture factor (NA). The factor f appears in Equation 6 to account for the fact that the numerical aperture of an interferometric microscope objective can affect the fringe spacing, and thus also the surface heights measured with the objective.

In calculating $Z_{phase}(X,Y)$, phase ambiguity can be avoided if the central intensity I3 is recorded within the zero fringe (that is, the fringe of maximum contrast). However, since it is difficult to ensure this condition, especially for the 270° phase step between frames, Equation 6 should be rewritten as $$Z_{phase}(X,Y) = \Delta(\text{step number}) + (f/2)[(\Delta\phi+2k\pi)\lambda/2\pi], \quad (7)$$

where k is the fringe order, which has to be determined in the unwrapping process.

The bottom portion of FIG. 3 illustrates the phase information retrieved from the white-light correlogram using this known algorithm. The filled circles in the figure indicate five consecutive intensity data points separated by 90° phase shift (i.e., a scanning step of $\lambda/8$), while the open circles indicate five consecutive intensity data points separated by a 270° phase shift (a scanning step of $3\lambda/8$). As illustrated, the phase difference $\Delta\phi$ is the relative phase from the best-focus position, where N$\alpha$ represents the absolute best-focus position (N being the number of steps in the scan measured from an arbitrary reference point).

Figure 4A:
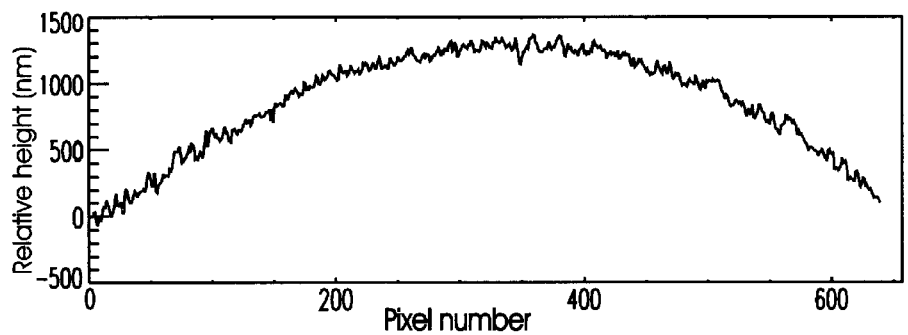
FIGS. 4A–4C illustrate the effectiveness of the phase correction of the invention in profiling the smooth curved surface of a ball bearing using 90° white-light phase shifting.
Figure 4B:
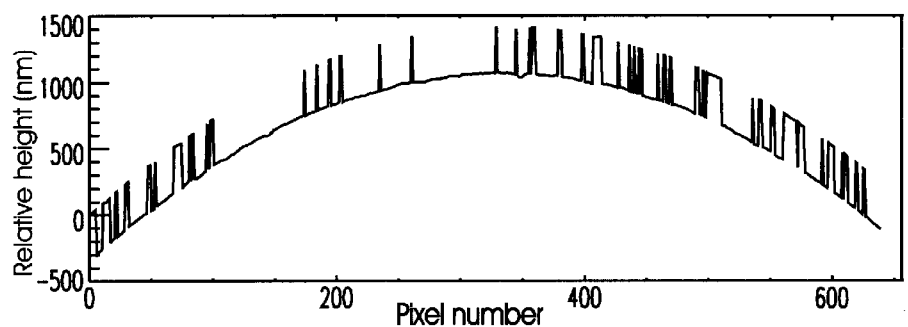

FIGS. 4A and 4B illustrate the effectiveness of the coherence-peak and the phase algorithms in profiling the smooth curved surface of a ball bearing using 90° white-light phase shifting. FIG. 4A is a height profile determined by the coherence-peak-sensing technique of Equation 2. FIG. 4B is a height profile determined by the phase measurement using Equation 6.

Figure 5A:
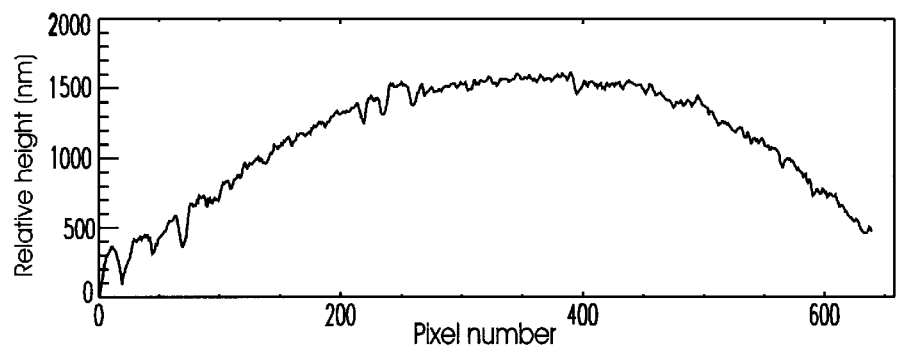
FIGS. 5A–5C illustrate the effectiveness of the phase correction of the invention in profiling the smooth curved surface of a ball bearing using 270° white-light phase shifting.
Figure 5B:
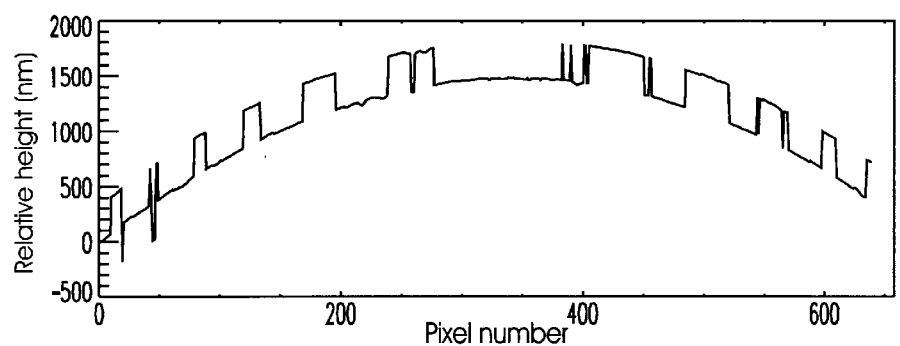

Similarly, FIGS. 5A and 5B illustrate the effectiveness of the same algorithms in profiling the smooth curved surface of a ball bearing using 270° white-light phase shifting. FIG. 5A is a height profile determined by the coherence-peak-sensing technique of Equation 2. FIG. 5B is a height profile determined by phase measurement using Equation 6.

As indicated, the novelty of this invention lies in the unwrapping process used to resolve $2\pi$ ambiguities. The two profiles obtained by coherence-peak-detection and phase measurement [$z_{envelope}(x,y)$ and $z_{phase}(x,y)$] are compared at each pixel in order to remove $2\pi$ ambiguities ($f\lambda/2$ in height) in conventional manner. In particular, $z_{phase}(x/y)$ and $Z_{envelope}(x,Y)$ are compared at each pixel x,y to see whether the height difference between them is less than $f\lambda/4$, that is $$Z_{phase}(X,Y) - Z_{envelope}(x,y) + \text{offset} \leq f\lambda/4, \quad (8)$$

where the offset is a measure of the constant phase shift on reflection, which can be estimated if the average of the difference between the two surface profiles is taken; i.e., offset $\sim 1/Z\Sigma(z_{envelope} - z_{phase})$ over Z data points. As one skilled in the art would readily understand, the resulting, corrected height profile from phase data is as good as that obtained from regular PSI.

Figure 4C:
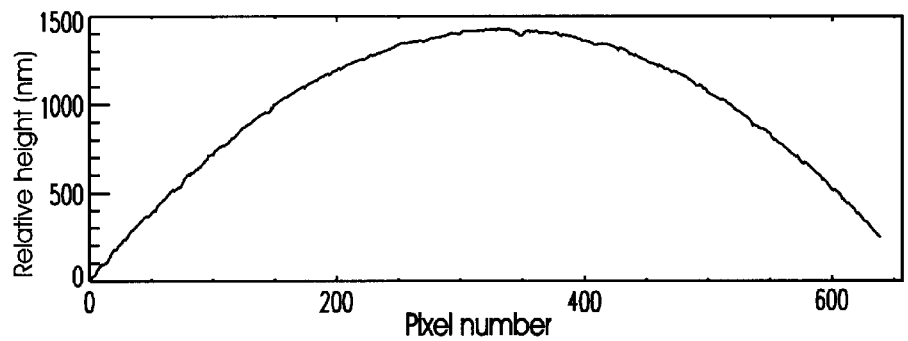
Figure 6A:
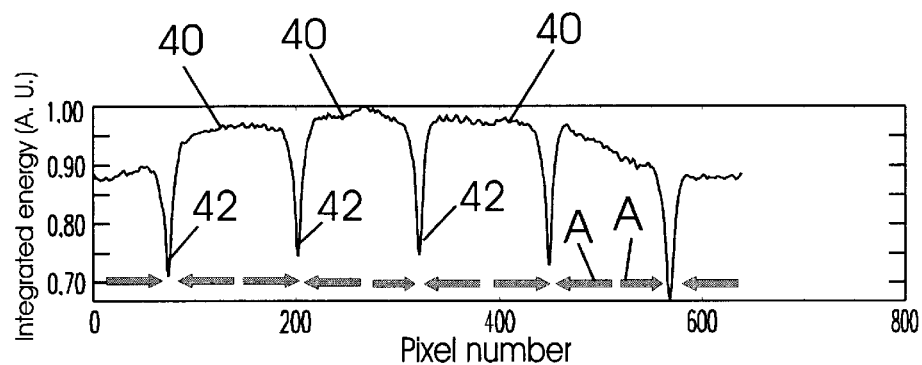
FIG. 6A is a profile of the energy distribution along the pixel positions of a cross-section of a 460-nm height-standard sample.
Figure 6B:
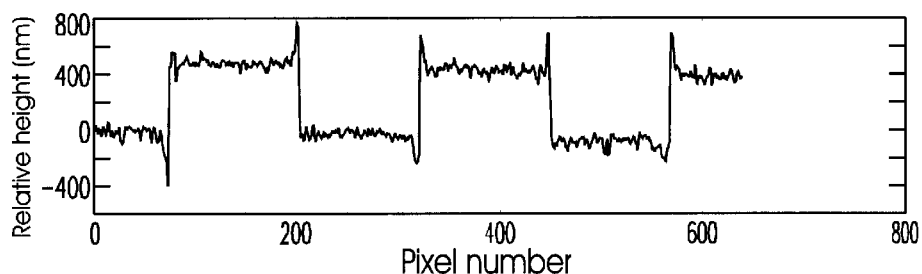
FIG. 6B is the surface profile of the 460-nm height-standard sample of FIG. 4A calculated using a coherence-peak-detection technique.
Figure 6C:
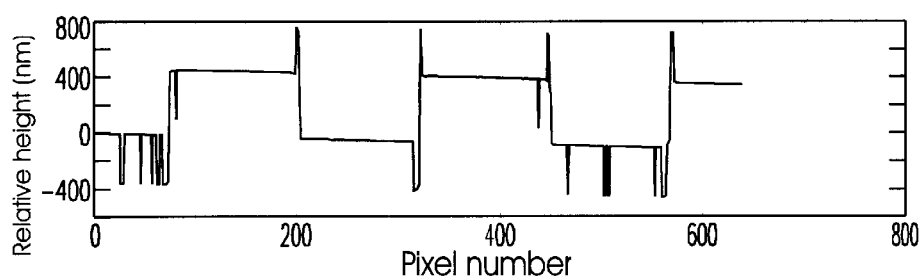
FIG. 6C is the surface profile of the 460-nm height-standard sample of FIG. 4A calculated using a phase-measurement technique.

According to the invention, the process of correcting $2\pi$ phase ambiguities and removing diffraction effects is carried out in multiple steps. In the first step the phase-unwrapping process is preferably started from a reliable position, such as from pixels corresponding to a smooth surface. The modulation contrast of the correlogram can be used as an indicator of a smooth surface. However, we found that integrating the energy through the vertical scan, such as shown in FIG. 6A, is a preferred indicator of smooth surface areas 40 in a sample with step discontinuities. As seen in the figure, the energy reduction at points near the edges of discontinuities in the height standard are clear. Thus, according to the preferred embodiment of the invention, unwrapping is performed from relatively high-energy positions 40 to energy minima 42, as illustrated by the arrows A in FIG. 6A. FIGS. 6B and 4C show the coherence-peak-detection and phase-measurement surface profiles calculated using Equations 2 and 6, respectively, after correction for phase ambiguities.

If the coherence length of the light source is larger than the step height, bat wings are expected to be significant in the profile obtained by the coherence-peak-sensing technique. Similarly, the process of phase-ambiguity removal reflected in Equation 8 is effective for the continuous portions of the surface, but cannot remove $2\pi$ jumps at positions close to the edges because of the bat-wing effects.

Thus, an additional step in the unwrapping procedure according to the invention consists of comparing the difference in height between two adjacent pixels obtained by coherence-peak and by phase measurements to a predetermined value, H, considered empirically to be approximately as large as the largest interpixel bat-wing effect produced by the coherence-peak technique. In essence, the slope of the height profile at each pixel is compared to a preselected value. Since it is known that diffraction effects cause greater artifacts in the coherence envelope than in the phase data, in each instance where the inter-pixel height difference (or slope) calculated by coherence-peak detection is smaller and the inter-pixel height difference calculated by phase is larger than the predetermined value H, the phase measurement is corrected by multiples of $2\pi$ to bring both inter-pixel height differences to within the arbitrary value H. Thus, for every pixel where the following relations are met, $$|Z_{envelope}(x,y) - Z_{envelope}(x-1,y-1)| \leq H \quad (9)$$

and $$|Z_{envelope}(x,y) - Z_{envelope}(x-1,y-1)| \geq H \quad (10)$$

the height corresponding to a $2\pi$ phase-change is repeatedly added to or subtracted from $z_{phase}(x,y)$ until the conditions $$|Z_{envelope}(x,y) - Z_{envelope}(x-1,y-1)| \leq H \quad (11)$$

and $$|Z_{envelope}(x,y) - Z_{envelope}(x-1,y-1)| \leq H \quad (12)$$

are satisfied. Note that the notation $(x-1,y-1)$ is used here to refer to any neighboring pixel with respect to the position (x,y), irrespective of direction and/or immediate proximity (that is, for example, the algorithm of the invention could be used equivalently by comparing pixels located diagonally and not immediately adjacent to the x,y position).

Figure 6D:
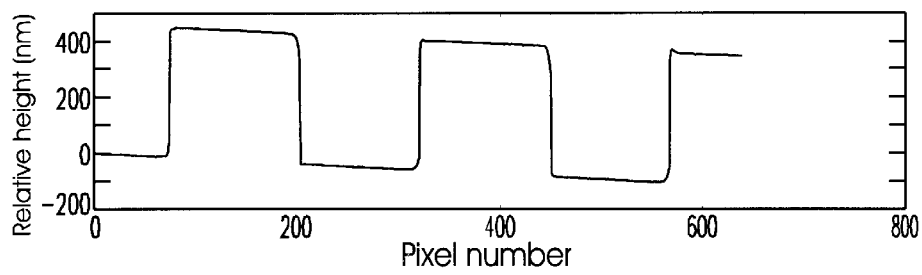
FIG. 6D is the surface profile of the 460-nm height-standard sample of FIG. 4A calculated using the unwrapping technique of the invention.

In practice, $2\pi$ in phase corresponds to $f\lambda/2$ in height. Therefore, H needs to be selected with a value less than $f\lambda/2$ but large enough to meet the requirement of Equation 9 at the edges of step discontinuities. As those skilled in the art would readily recognize, a larger H is needed for smaller-resolution systems, and a range of suitable values can be used to practice the invention. Testing and empirical data make it possible to select a value that works well with a particular type of sample surface. We found that $f\lambda/4$ (note the inclusion of the system's numerical-aperture factor) is a good practical value for H when measuring smooth surfaces with steps in a white-light system. Accordingly, Equations 9–12 are modified such that, for every pixel where the following specific relations are met, $$|Z_{envelope}(x,y) - Z_{envelope}(x-1,y-1)| \leq f\lambda/4 \quad (13)$$

and $$|Z_{envelope}(x,y) - Z_{envelope}(x-1,y-1)| \geq f\lambda/4 \quad (14)$$

the quantity $f\lambda/2$ is repeatedly added to or subtracted from $z_{phase}(x,y)$ until the conditions $$|Z_{envelope}(x,y) - Z_{envelope}(x-1,y-1)| \leq f\lambda/4 \quad (15)$$

and $$|Z_{envelope}(x,y) - Z_{envelope}(x-1,y-1)| \geq f\lambda/4 \quad (13)$$

are satisfied. FIG. 6D shows the surface profile of FIG. 3C after full correction and removal of bat wings according to this process.

It is noted that bat wings usually have a lateral extension over several pixels from the edge of a step, and their maximum height is less than 200 nm when measured with a white-light source that has a mean wavelength near 600 nm. Therefore, it can be assumed that bat wings introduce an error to the height difference between adjacent data points of less than $f\lambda/4$ for most cases.

Figure 7A:
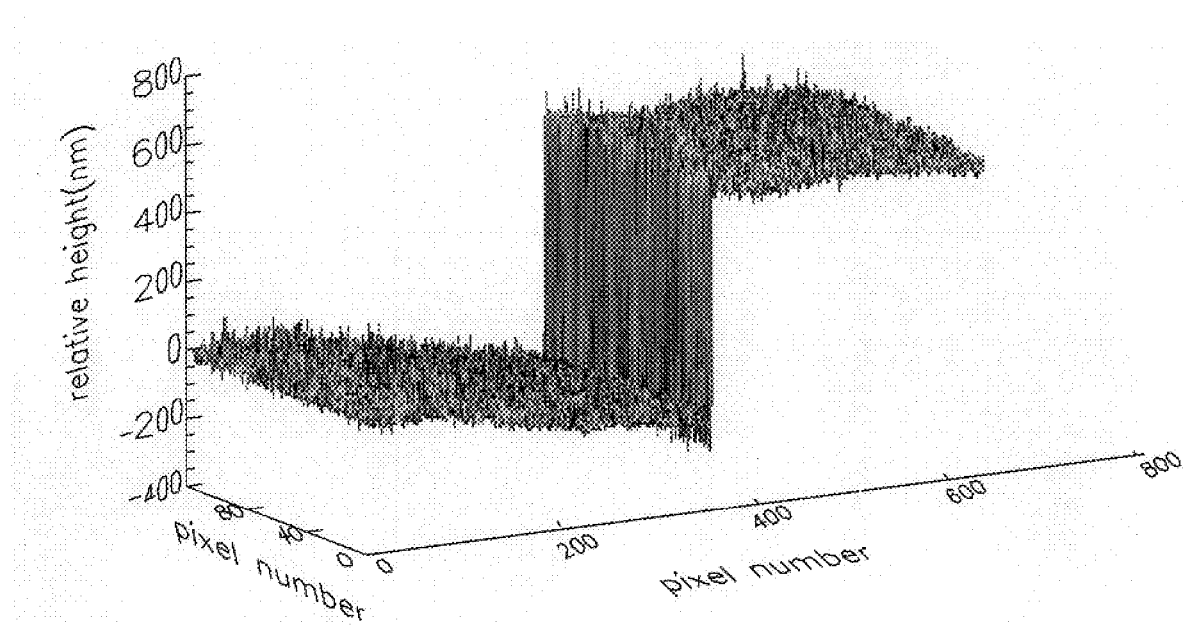
FIG. 7A is the profile of the step standard obtained using a conventional coherence-peak-sensing algorithm with a filtered tungsten light source.
Figure 7B:
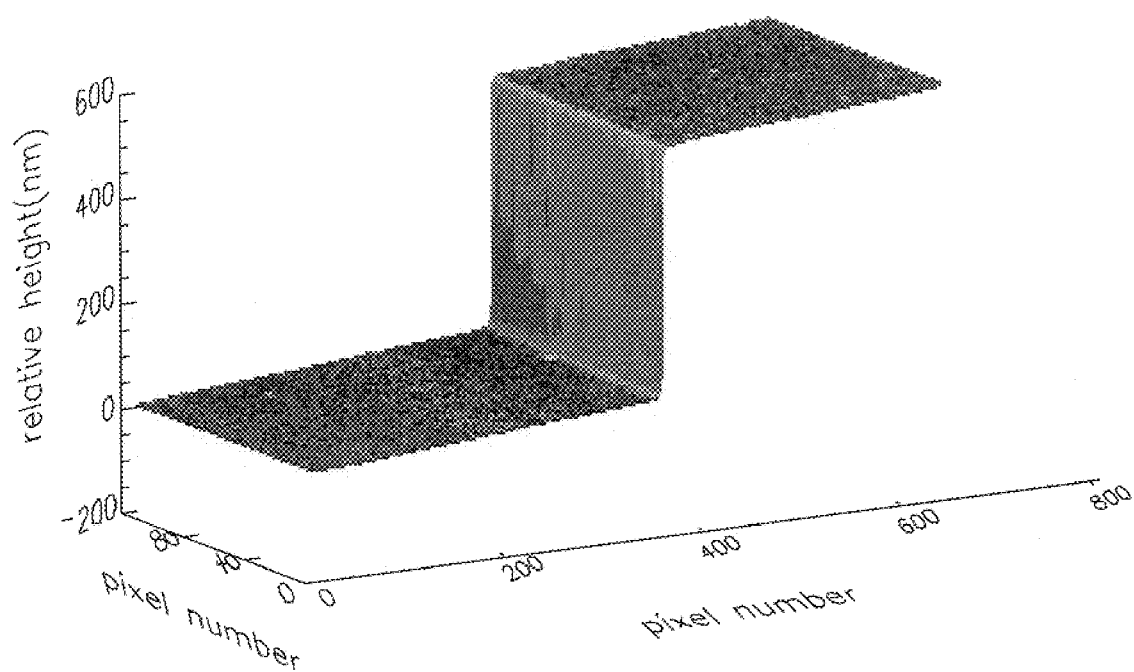
FIG. 7B is the profile of the sample of FIG. 7A obtained using the technique of the invention.

A step-height standard (VLSI, SHS 4600 Å) measurement was conducted to demonstrate the technique of the invention. FIG. 7 shows a comparison between the profile of the step standard obtained from the coherence-peak-sensing algorithm of Equation 2 and from the method of the invention. A tungsten light source with an 80-nm bandpass filter at the center wavelength of 600 nm was used. FIG. 7A is the profile produced by a conventional coherence-peak-detection algorithm. FIG. 7B is the corresponding profile obtained using the technique described above. The height-resolution improvement is clearly seen, as well as the removal of bat-wing effects, from the comparison of the two figures.

Figure 8A:
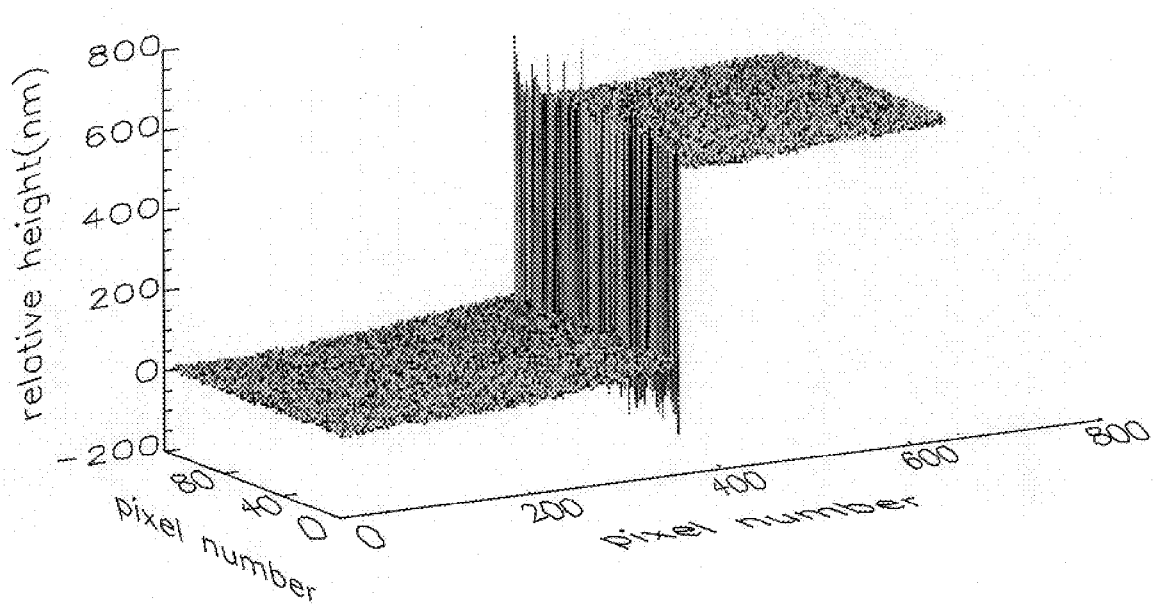
FIG. 8A is the profile of the step standard obtained using a conventional coherence-peak-sensing algorithm with an unfiltered tungsten light source.
Figure 8B:
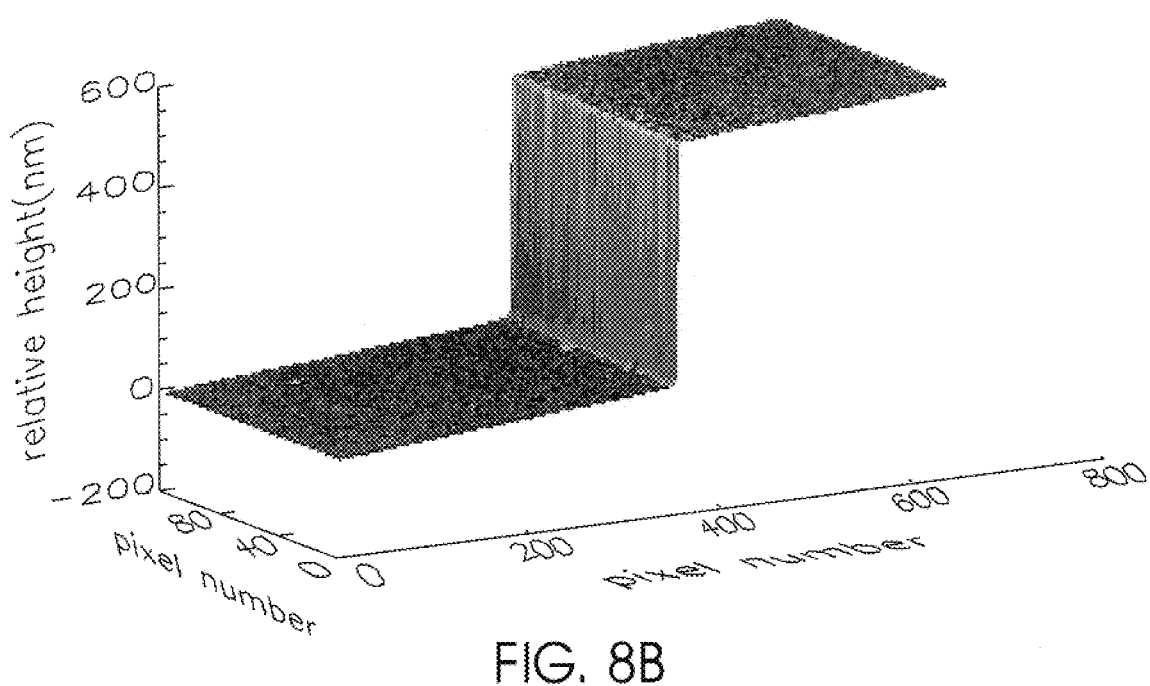
FIG. 8B is the profile of the sample of FIG. 8A obtained using the technique of the invention.

Similarly, FIG. 8 illustrates a comparison between the results produced by conventional VSI and the present invention on the same step standard using an unfiltered tungsten light source. FIG. 8A is the profile produced by the conventional coherence-peak-detection algorithm. FIG. 8B is the corresponding profile obtained using the technique of the invention after 2π phase correction and bat-wing removal.

Figure 5C:
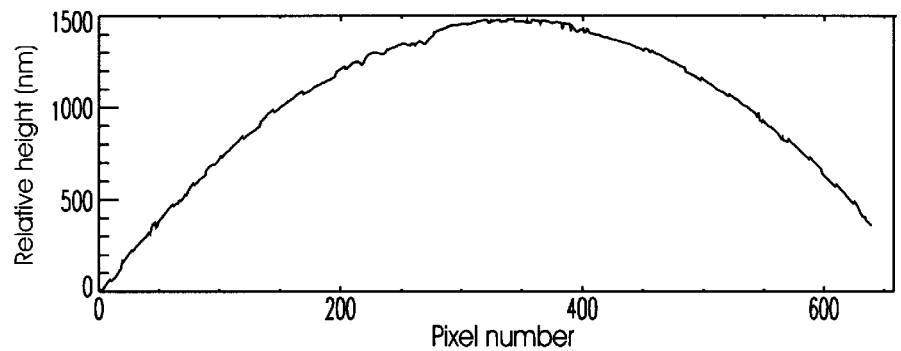

Thus, it has been demonstrated that the technique of the invention can be used to remove bat wings from step discontinuities in profiles generated with VSI measurements. The invention can also be used advantageously to eliminate occasional spikes that appear in smooth surfaces as a result of artifacts or local aberrations in the data collected during scanning. The algorithm expressed in Equations 13–16 has been found to virtually eliminate these spikes as well. FIGS. 4C and 5C illustrate the height profiles of FIGS. 4B and 5B, respectively, after correction of 2π ambiguities using the algorithm of the invention.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

We claim:

1. A method of reducing diffraction effects that cause erroneous measurements in a sample surface profiled by vertical scanning interferometry using a broad-bandwidth light source, the method comprising the following steps:
   (a) producing a coherence height-profile of the sample surface using a coherence-sensing technique;
   (b) producing a phase height-profile of the sample surface using a phase-sensing technique;
   (c) correcting the phase height-profile to eliminate 2π ambiguities;
   (d) calculating a coherence interpixel-change from the coherence height-profile and a phase interpixel-change from the phase height-profile at pixels approaching said step discontinuity;
   (e) comparing the coherence interpixel-change and the phase interpixel-change to a predetermined quantity; and
   (f) at each location where the coherence interpixel-change is smaller than said quantity and the phase interpixel-change is larger than the quantity, correcting the phase height-profile by multiples of $f\lambda/2$, such as to produce a resulting phase interpixel-change that is smaller than the quantity;
   wherein f is a numerical-aperture factor of an objective and $\lambda$ is a wavelength of a light source used to carry out steps (a) and (b).

2. The method of claim 1, wherein said quantity is set at a value approximating a maximum diffraction effect experienced while performing said vertical scanning interferometry.

3. The method of claim 1, wherein said quantity is set at about $f\lambda/4$, where $\lambda$ is a mean wavelength of the light source and f is a numerical-aperture factor of an objective used to carry out the vertical scanning interferometry.

4. The method of claim 1, wherein said step (a) is carried out is using a least-squares fitting approach.

5. The method of claim 1, wherein said step (b) is carried out by calculating phase around coherence maxima detected by said coherence-sensing technique.

6. The method of claim 1, wherein said step (c) is carried out by removing an offset between the coherence height-profile and the phase height-profile, and further by comparing the coherence height-profile with the phase height-profile and correcting the phase height-profile such as to produce a resulting difference between the coherence height-profile and the phase height-profile that is less than $f\lambda/4$, where $\lambda$ is a mean wavelength of the light source and f is a numerical-aperture factor of an objective used to carry out the vertical scanning interferometry.

7. The method of claim 6, wherein said offset is the average of the difference between the coherence height-profile and the phase height-profile over a plurality of pixels.

8. The method of claim 1, wherein said step (c) is carried out beginning at pixels of maximum energy detection progressing toward pixels of minimum energy detection.

9. The method of claim 7, wherein said step (c) is carried out beginning at pixels of maximum energy detection progressing toward pixels of minimum energy detection.

10. Apparatus for reducing diffraction effects that cause erroneous measurements in a sample surface profiled by vertical scanning interferometry using a broad-bandwidth light source, comprising the following:
    (a) means for producing a coherence height-profile of the sample surface using a coherence-sensing technique;
    (b) means for producing a phase height-profile of the sample surface using a phase-sensing technique;
    (c) means for correcting the phase height-profile to eliminate 2π ambiguities;
    (d) means for calculating a coherence interpixel-change from the coherence height-profile and a phase interpixel-change from the phase height-profile at pixels approaching said step discontinuity;
    (e) means for comparing the coherence interpixel-change and the phase interpixel-change to a predetermined quantity; and
    (f) at each location where the coherence interpixel-change is smaller than said quantity and the phase interpixel-change is larger than the quantity, means for correcting the phase height-profile by multiples of $f\lambda/2$ such as to produce a resulting phase interpixel-change that is smaller than the quantity, wherein f is a numerical-aperture factor of an objective and $\lambda$ is a wavelength of a light source used in the apparatus.

11. The apparatus of claim 10, wherein said quantity is set at a value approximating a maximum diffraction effect experienced while performing said vertical scanning interferometry.

12. The apparatus of claim 10, wherein said quantity is set at about $f\lambda/4$, where $\lambda$ is a mean wavelength of the light source and f is a numerical-aperture factor of an objective used to carry out the vertical scanning interferometry.

13. The apparatus of claim 10, wherein said means for producing a coherence height-profile of the sample surface using a coherence-sensing technique includes a means for performing a least-squares fit.

14. The apparatus of claim 10, wherein said means for producing a phase height-profile of the sample surface using a phase-sensing technique includes means for calculating phase around coherence maxima detected by said coherence-sensing technique.

15. The apparatus of claim 10 wherein said means for correcting the phase height-profile to eliminate 2π ambigu ities includes means for removing an offset between the coherence height-profile and the phase height-profile, and further means for comparing the coherence height-profile with the phase height-profile and correcting the phase height-profile such as to produce a resulting difference between the coherence height-profile and the phase height-profile that is less than $f\lambda/4$, where $\lambda$ is a mean wavelength of the light source and f is a numerical-aperture factor of an objective used to carry out the vertical scanning interferometry.

16. The apparatus of claim 15, wherein said offset is the average of the difference between the coherence height-profile and the phase height-profile over a plurality of pixels.

17. The apparatus of claim 10, wherein said step (c) is carried out beginning at pixels of maximum energy detection progressing toward pixels of minimum energy detection.

\* \* \* \* \*